United States Patent [19]

Berg et al.

[11] 4,054,267
[45] Oct. 18, 1977

[54] STRAP WINCH

[76] Inventors: Odd Berg, Myntvagen 9, 890 23 Sjalevad; Nils Nasstrom, Asvagen 22, 891 00 Ornskoldsvik, both of Sweden

[21] Appl. No.: 593,200

[22] Filed: July 7, 1975

[30] Foreign Application Priority Data

July 12, 1974  Sweden ................................ 7409199

[51] Int. Cl.² ............................................ A63B 61/04
[52] U.S. Cl. ................................. 254/164; 105/475; 105/477; 226/114; 226/149; 226/151
[58] Field of Search ................. 254/161, 164, 175.5, 254/175.6, 175.7; 226/151, 149, 147, 114; 280/179 R, 179 A; 105/469, 470, 471, 475, 477

[56] References Cited

U.S. PATENT DOCUMENTS

| | | | |
|---|---|---|---|
| 463,935 | 11/1891 | Blackburn | 226/151 X |
| 763,781 | 6/1904 | Nicholson | 254/161 X |
| 772,157 | 10/1904 | Koehler | 280/179 A |
| 976,941 | 11/1910 | Sourek | 254/73 |
| 1,123,509 | 1/1915 | Forest et al. | 280/179 A |
| 1,189,381 | 7/1916 | Payne et al. | 254/152 |
| 1,893,723 | 1/1933 | Wood | 254/164 |
| 2,421,474 | 6/1947 | Alter | 226/151 X |
| 2,935,299 | 5/1960 | Jansen | 226/147 X |
| 2,946,563 | 7/1960 | Eaton | 280/179 A X |
| 2,953,290 | 9/1960 | Kostenko et al. | 226/151 |
| 3,128,106 | 4/1964 | Zinkel, Jr. | 280/179 A |
| 3,770,244 | 11/1973 | McCloud | 254/164 |

*Primary Examiner*—L. J. Paperner
*Assistant Examiner*—Donald W. Underwood
*Attorney, Agent, or Firm*—Blanchard, Flynn, Thiel, Boutell & Tanis

[57] ABSTRACT

A device for stepwise pulling in with great force and stowing a belt or strap, comprising a stepwise feeding mechanism which pulls in the strap through a locking means allowing passage of the strap towards the mechanism but locking the movement of the strap in the opposite direction, and a storage or winding-in device for collecting the fed-in strap. The step feeding mechanism comprises two elements, which are pivotable about a common axis, together as well as relatively to each other. The strap passes between the elements which co-act with each other and with the strap so that when they are swung together in one direction they grip and coil the strap while simultaneously pulling in the strap. When the elements are swung back in the opposite direction they move somewhat relatively to each other, thereby releasing the strap. When the elements are swung once again in the first direction they can thus grip a new length of the strap and pull it in a further distance, whereafter the cycle is repeated while generating a large force in the strap.

10 Claims, 16 Drawing Figures

STRAP WINCH

The present invention relates to a strap winch, this expression being used anologously with "cable winch", and thus relates to a device for winding up a strap or a belt on a roller or storage reel, the winch being arranged to pull in the belt or strap with great force.

In recent years straps made from textile material on a synthetic basis have gained extensive use due to their relative cheapness, great strength and resistance to moisture and chemical attack. The textile materials in the straps usually consist of fibres made from polyester or polyamide material (terylene, nylon). Accompanying their good quailities, these and similar materials have the drawback that their surface friction is rather low, which creates certain difficulties when the strap is to be clamped fast in catches of different kinds, while at the same time the material shows a tendency to a certain amount of plastic deformation under clamping pressure, all of which results in that straps of this kind often have a tendency to glide or slip in their fastenings. The problem is by no means insoluble, but these qualities of synthetic straps or belts must be continually observed and taken into account.

Probably because of the aforementioned qualities of the synthetic belts at present generally available, the winching or reeling devices so far proposed for such straps have in general simply consisted of a roller or reel on which the strap is wound up, the reel shaft being driven by a reduction means with a high reduction ratio, or by a device for rotating the shaft in steps, thereby enabling it to expose the shaft and thus the roller to a large torque. The strap is wound spirally on to the reel, and the diameter of the reeled-on strapping quickly increases. It becomes thereby more and more difficult to provide really large tension in the strap via the reel shaft, since the force must be transmitted via the reeled-on strapping which is thick and deformable. The many turns of the strap wound onto the reel are tightly packed, and as they yield elastically at the same time it will be difficult or impossible to apply a large distinct force in the strap via the reel shaft.

The object of the invention is to provide a strap winch in which the strap is instead pulled home by means of a special pulling device working stepwise, which momentarily grips the strap and pulls it in with great force, a length at a time, whereafter the pulled-home strap is successively wound onto a spring or hand operated reel of a type known per se. This object is attained and the drawbacks in conjunction with earlier strap winches indicated above are circumvented by the strap winch according to the invention being given the characterizing features disclosed in claim 1.

Some embodiments of the invention will now be described with a view to exemplification, while referring to the attached drawings, on which FIGS. 1–4 are schematic views, illustrating the way in which the mechanism pulling or feeding the strap works in a strap winch according to the invention, FIG. 1a being a cross-sectional view along the line Ia—Ia in FIG. 1.

In FIGS. 1–4 there is shown schematically how a strap or a belt 10 is stepwise drawn in with great force, and successively wound up on a storage reel 12. As previously mentioned, the strap 10 is of the modern type consisting of synthetic fibre material, e.g. polyester or polyamide, and is distinguished by a very high tensile strength. The reel 12 is in principle a sprung winding drum, i.e. a continual torque M is applied to it, clockwise in this case, by a suitable unillustrated spring biasing device, e.g. a spiral spring in a spring casing. The reel is thus caused continually to wind into itself the strapping which is pulled towards it. According to FIGS. 1–4 the strap passes through a locking device and a pulling means, generally designated 14 and 30, respectively, before being wound onto the reel. The locking device 14 can be made in several different ways, and in principle it functions so that it allows the strap to move in one direction, in this case to the left towards the reel, but locks the strap against movement in the opposite direction. In this case the locking device has the form of a wedge lock, i.e. it consists of a rigid upper guide in the form of a block or crosspiece 16 and a rigid lower guide 18, the guides defining between them a wedge-shaped space which is filled by the strap 10 and a movable wedge 20 which yieldingly, e.g. by means of a spring 22, is pressed into the wedge space to the right according to the figures. In a known way, the strap will thus be locked against being pulled right-ward while its movement left-ward is allowed.

Figures 1, 1A:
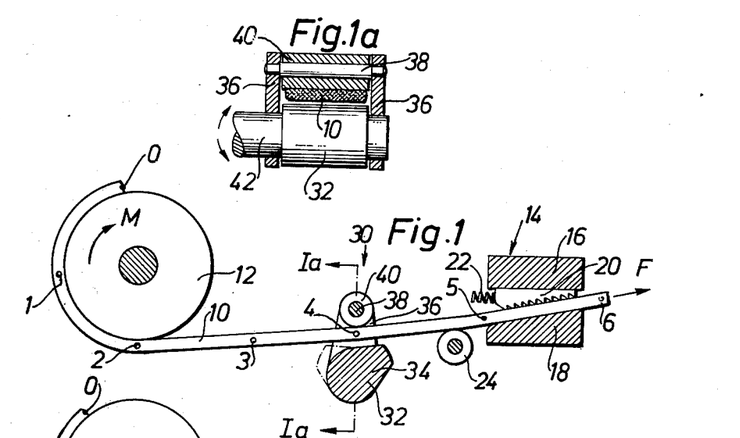

The pulling means 30, which is between the blocking device 14 and the storage reel 12, consists of a camshaft 32 arranged to swing (i.e. pivot) backwards and forwards and provided with a cam peak 34. A cheek plate 36 is mounted at either end of the camshaft, see FIG. 1a. Both the cheek plates are united by a shaft 38, and on this a counter roller in the form of a tube or socket 40 is freely mounted. The cheek plates 36 with the shaft 38 and the roller 40 constitute a stirrup, swinging freely on and about the camshaft, as is clear from FIG. 1a, which also indicates that one end of the camshaft is extended with an operating shaft 42 by which it can be twisted.

Figures 2, 3:
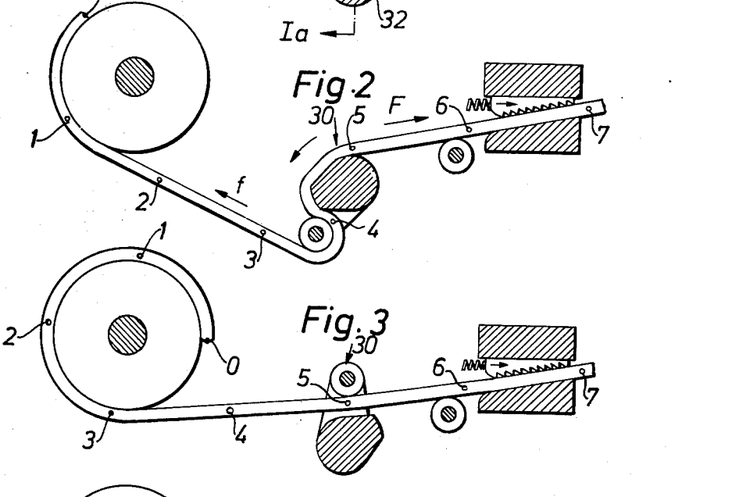

In the initial position as shown in FIG. 1, the strap 10 extends into the locking device 14, passes freely through the pulling means 30, between the roller 40 and camshaft 32 thereof, and has its free end wound onto the storage reel 12. In the locking device 14 the wedge 20 engages with the strap 10 to wedge it against the lower guide 18 and according to the principle of a wedge lock, an external force F applied to the strap will only increase wedging of the strap. If the camshaft 32 is now swung anti-clockwise (see FIG. 2) the strap 10 will be gripped between the cam peak 34 and the roller 40, the height of the peak and distance between the camshaft and roller being so adjusted that the strap is exposed to a heavy nipping or clamping effect between the cam peak 34 and the roller 40. The strap is thus forced to follow the movement of the pulling means and partially engage around the camshaft 32 and roller 40 of such pulling means, approximately as shown in FIG. 2. As the strap is now gripped by the pulling means, the latter will obviously pull in the strap from either direction; a small length of strap is wound from the reel 12 and pulled towards the pulling means 30 from left to right, simultaneously as another length of strap is drawn in through the locking device 14, which is arranged to allow the strap through from this direction.

Reference points are marked on the strap to facilitate following the movement of it. Its end on the reel 12 is designated 0, and then points 1, 2, 3 and so on are marked along the strap at a uniform pitch, the distance between the points approximately corresponding to the distance by which the strap is drawn through the locking device 14 for an average pulling movement. As may be seen, point 4 is initially at the roller 40 and during the pulling movement it follows the roller as shown in FIG. 2. On returning from the position of FIG. 2, i.e. by swinging the camshaft 32 back again clockwise, the strap will be momentarily released, simultaneously as it is once again nipped in the locking device 14, allowing the storage reel 12 to reel in the slack under actuation of its spring mechanism. The situation according to FIG. 1 has thus been re-established with the difference, as shown in FIG. 3, that a length of strap has been pulled in, and the amount of strap taken up on the storage reel 12 has been increased to a corresponding extent. The camshaft 32 can be swung backwards and forwards 90°-120° in this way, and by carrying out the movement, for example with the help of a lever, the length of which is large compared with the effective leverage of the camshaft, a very large force can obviously be induced in the strap.

Figure 4:
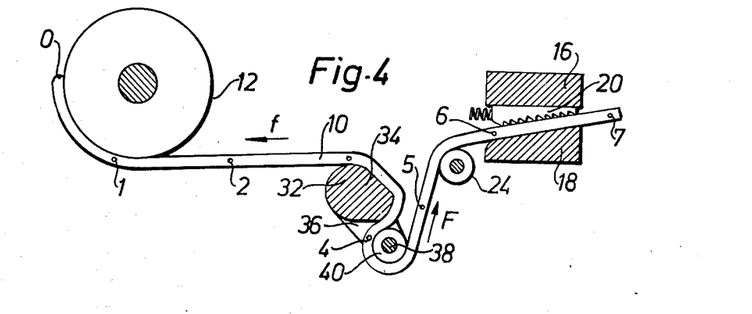

According to the above it is assumed that the pulling means 30 is swung anticlockwise for carrying out its pulling-in movement. The same pulling-in or feeding effect is obtained, however, if the pulling means is instead swung clockwise. The starting position of the camshaft 32 in relation to the counter roller 40 will in this case be as indicated by the dotted lines in FIG. 1. On turning clockwise toward its FIG. 4 portion, the cam peak 34 will clamp the strap against the roller 40 from the left instead of the right, as previously, and the strap is caused to follow round the pulling means from the right hand side of the means. It is suitable to arrange here a snub roller 24 under the strap immediately behind the locking device 14, whereat a loop of the strap will thus be pulled down between this snub roller 24 and the pulling means 30, as shown in FIG. 4. When the pulling means 30 is swung back towards its FIG. 1 dotted line portion, the strap is once again released, and the magazine roller 12 can wind up a further length of strap as before.

In practice, the method of working according to FIG. 4 is of very great importance, since it gives the pulling means a stronger grip on the strap during the pulling movement. As was pointed out in the introduction, the modern straps manufactured from synthetic material often have a combination of "slipperiness" and plasticity which makes their immediate wedging during the pulling movement more difficult. In the position according to FIG. 2, when the outer strap tension F, which can be very great, is applied to the strap to the right of the pulling device 30, while a negligible tensile force $f$ caused by the spring mechanism of the storage reel 12 acts in the strap to the left of the pulling device, the risk especially arises that the strap will glides or slips in spite of its being exposed to constrictive engagement between the camshaft 34 and the rolle 40. The method of operation according to FIG. 4 signifies a considerable improvement in this respect, which is immediately demonstrated by an analysis of the force geometry: In this case the part of the strap coming from the outer side of the feeding roller 40 will not be subject to the insignificant force $f$ but to the much larger outer strap tension F, which means that the whole cam stirrup 36, 38, 40 experiences a large anticlockwise resisting force as cam shaft 32 moves to its FIG. 4, positions resulting in heavy clamping of the portion of the strap between the cam peak 34 and the roller 40.

It should be noted that the above description and the devices shown in FIGS. 1–4 are only of a schematic character, and both the locking device 14 and the pulling means 30 can be made in a different manner within the scope of the invention. It may be said in general with regard to the locking device 14 that it is to work as a one-way lock, i.e. lock the strap in one direction and allow it to pass in the other, while the pulling means 30 shall be capable of alternatively clamping and allowing the strap to go free while pulling a length of the strap forward during the clamping operation, for which purpose several constructional embodiments can be conceived. The one shown is extremely simple but can be modified in different ways, especially for increasing the firmness of the grip between the means and the strap during the pulling movement, while ensuring that the subsequent freedom of passage is complete. It is important that the storage reel 12 is able to pull the strap through the open pulling means 30 without difficulty, while exercising its moderate spring bias, without there being any risk for seizing in this position. With regard to the cam stirrup 36, 38, 40, pivotable on the camshaft 32, it may sometimes be suitable to refrain from having the roller and instead to form a rigid cam counter bar which is arranged to coact with the peak portion 34 of the camshaft for instantaneous clamping of the strap. The engaging surfaces can hereby be fluted in a suitable manner to increase the firmness of the frictional engagement.

Figure 11:
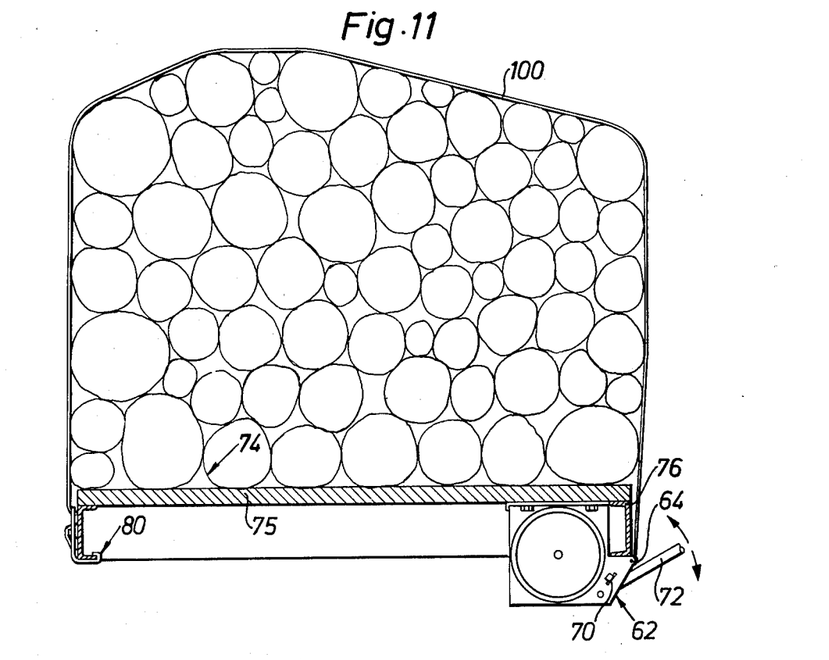
FIG. 11 shows the strap winch according to the invention mounted on the deck or loading platform of a lorry for holding down cargo.

In FIGS. 5–11 a practical application of the invention is shown in the form of a strap winch, intended to be used for tensioning a strap of the kind in question over the load on a lorry deck. Here the winch is made with such an exterior shape that it can be easily fixed to the underside of the lorry deck, inside one of the chassis beams carrying the deck, e.g. as shown in FIG. 11.

Figure 5:
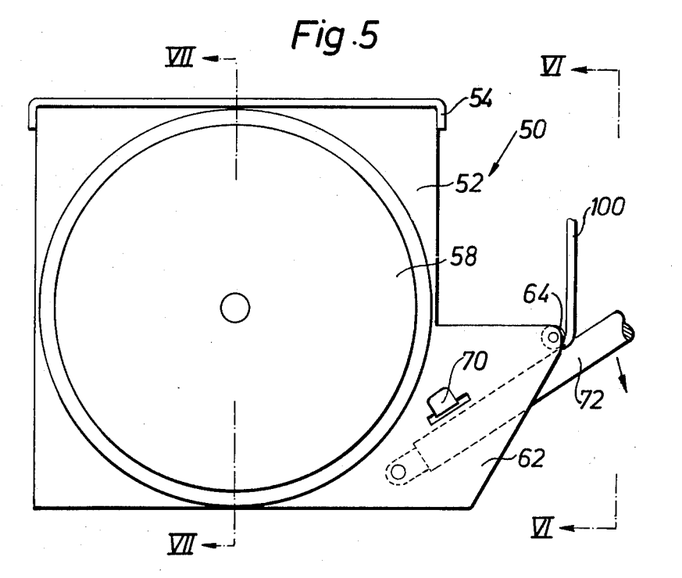
FIG. 5 is a side elevation of a strap winch according to the invention.
Figure 6:
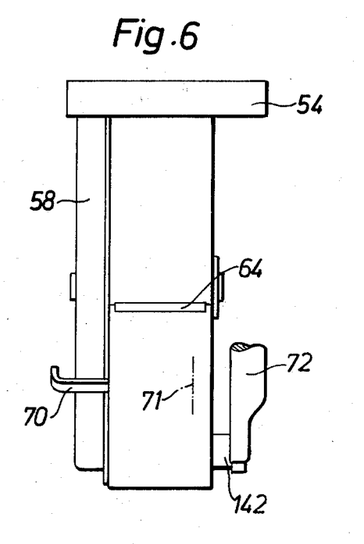
FIG. 6 is a front elevation of the winch seen from the plane denoted by the line VI—VI in FIG. 5.
Figure 7:
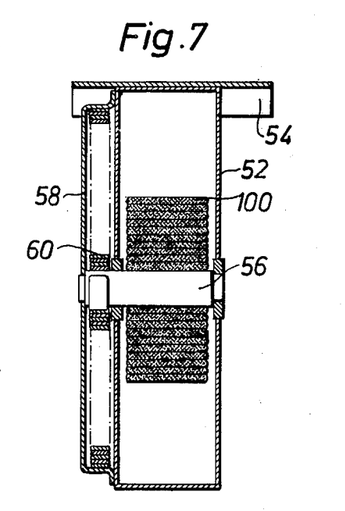
FIG. 7 is a cross-sectional view along the line VII—VII in FIG. 5.

The strap winch shown in FIGS. 5–7 comprises a housing 52, the upper side of which is provided with an attachment flange or an attachment fitting 54 for securing the winch to the underside of the lorry deck. In the housing 52 a central through shaft 56 is journalled, on which is wound the strap or belt 100. As may be seen from FIG. 7, the shaft 56 extends out into a spring casing 58 on the left outer side of the housing. The casing 58 accomodates a long spirally wound spring 60, one end of which is attached to the inside of the spring housing 58 while the other end is attached to the end of the shaft 56 projecting into the spring casing. Together with the spring the shaft thus forms a spring-biassed reel in a known manner, and functions so that when the strap 100 is reeled off the shaft 56, the spring 60 is tensioned and will thereby be in a condition to once again reel up the strap when this is released for movement towards the shaft.

The lower right hand portion of the strap winch as shown in FIG. 5 is drawn out into a nose portion 62, intended to project out at the side of the lorry deck, as will be more closely described while referring to FIG. 11, and in this nose portion is housed the operating mechanism which is made in accordance with the principles described with reference to FIGS. 1-4. The central shaft 56 of the winch forms, together with the reeled-on strap 100, a storage roller 112 (see FIG. 8) from which the necessary length of strap is drawn from time to time. The strap passes over a pulling means 130, agreeing in principle with the previously described means 30. The strap 100 passes between a roller 140 and a camshaft 132 with a cam peak or hump 134, which in this case is attached to the shaft 132 by means of one or more screws 135. The roller 140 is journalled on a stirrup freely swinging about the camshaft 132, the stirrup consisting of the cheek plates 136 united by a shaft 138.

The strap 100 passes from the pulling means 130 over a snub roller 124 through a locking wedge device 114, principly in agreement with the previously described device 14 for the same purpose. In accordance herewith, an upper 116 and a lower 118 fixed guide or guide bridge are welded onto the nose portion 56 of the winch housing, to form between themselves a wedge-shaped space occupied by the strap which glides along the lower guide 118, and a movable wedge 120 is pressed by a spring 122 in between the strap and the upper guide bridge 116. As may be seen, there is a bearing ball 126 sunk into the upper side of the wedge for rolling against the underside of the upper guide 116, which consists of hard steel, for reducing friction and facilitating the movement of the wedge. The ball 126 is so placed that it is near the centre of pressure of the wedge, i.e. where the force resultant of the wedge engagement pressure against the strap is to be found. Several balls can be used, and possibly the balls can be replaced by bearing rollers. The spring 122 is suitably a flat spring or a leaf spring attached to a boss 66 on the inside of the housing 52. With its free end the spring 122 engages in a groove 121 on the back end surface of the wedge 120, thereby pushing the wedge towards its engagement position. From the blocking device 114 the strap continues out of the winch housing and passes over a snub roller 64 which is journalled in the tip of the nose portion 62, as shown in FIG. 8.

Figures 8, 8A, 9, 10:
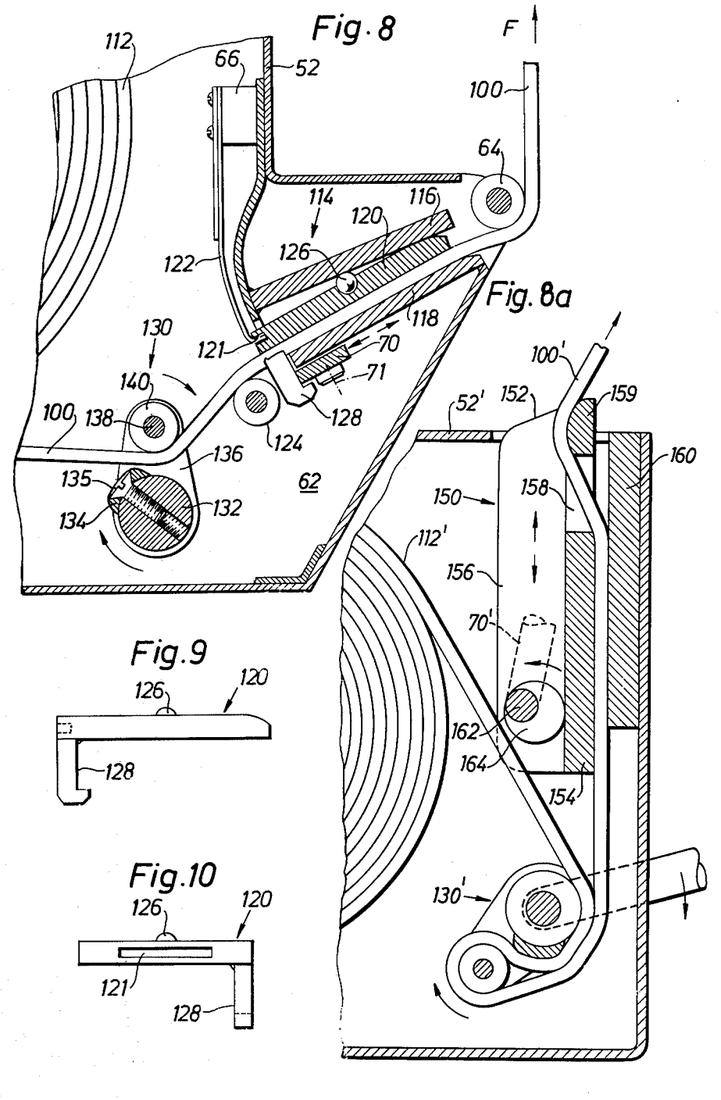
FIG. 8 is an enlarged detail section through the portion of the strap winch which houses the pulling mechanism.
FIG. 8a is a section corresponding to FIG. 8, but shows an alternative embodiment of the strap winch, its pulling mechanism incorporating a modified locking device.
FIGS. 9 and 10 are side and front elevations respectively of a locking wedge in a pulling mechanism according to FIG. 8.

The described embodiment of the invention is arranged to work in the way schematically illustrated in FIG. 4, i.e. the pulling means 130 makes a clockwise working stroke according to FIG. 8, whereat the strap 100 is clamped between the hump 134 and the roller 140 and is forced to form a loop which is drawn obliquely downwards to the right while being snubbed over the roller 12, the wedge 120 releasing its locking engagement with the strap and a length of the latter is thus pulled into the housing. When the pulling means 130 is again swung backwards anticlockwise, returning to, and passing the position shown in FIG. 8, the strap is released and the storage reel 12 can wind up a length of strap corresponding to the recently formed loop, while the wedge 120 under the action of the spring 122 moves to take up its locking engagement and prevents the strap from gliding back out. Operation is by the help of a lever 72 (see FIGS. 5 and 6) attached to an operating shaft 142 journalled in the housing 52 and constituting an extension of the camshaft 132.

An important practical detail in the strap winch according to the invention is a disengaging means, which has been introduced to enable disengagement of the locking device 114. It is accepted that in the initial or inactive position, the whole of the strap length in use is wound up on the storage roller 112, and the free strap end which is united in some suitable manner with an attaching hook or the like is immediately outside the snub roller 64, the said attaching hook being hooked in a suitable manner onto a holder means on the outside of the winch. When the strap winch is to be used for tieing an object onto the lorry eck, it should be possible to draw the desired strap length freely out of the housing 52 without hindrance from the locking means 114, which normally locks the strap against movement in this direction. For enabling withdrawal of the strap, a disengaging device has been introduced which will now be described.

The locking wedge 120, which is shown separately in FIGS. 9 and 10, is provided with an operating finger 128 welded to one corner. As may be seen from FIG. 8, this finger projects downwards at the side of the strap 100 and reaches below the underside of the guide or guide bridge 118. On the underside of the latter there is a disengaging arm 70 pivotally mounted in a plane parallel to the bridge 118. As is shown in FIGS. 5 and 6 the disengaging arm 70 passes out through a slot in the left side, according to FIG. 6, of the nose portion 62, and its pivot 71, in the shape of a simple journalling pin, is mounted in the vicinity of the opposite wall of the nose portion. As shown in FIG. 8 the arm 70 can engage with the operating finger 128 and if the arm is swung downwardly to the left, according to this figure, the nose wedge 120 is compelled to move towards a disengaging position, and as long as the disengaging arm is actuated the wedge can not move into the locking position, and the strap can be pulled freely through the locking device 114. At the same moment as the arm 70 is released, the wedge 120 is once again biassed towards its locking position by the spring 122.

An alternative embodiment of the locking device necessary to the strap winch according to the invention is shown in FIG. 8a. In this case the strap winch is accomodated in a housing 52' with a generally square cross section, and as may be seen, a pulling means 130', of the same design as the one previously described and designated 130, is arranged in the lower righthand portion of the housing 52 seen in the figure, while a winding reel 112', turned by hand or by a spiral spring is accomodated centrally in the lefthand portion of the housing. The alternative embodiment of the locking device, generally designated 150, is placed substantially straight above the pulling means 130', in the upper righthand corner of the housing 52', and comprises a slide means or carriage 152 with a generally U-shaped cross-section. The slide means thus consists of a bottom portion 154 with upstanding flanges 156. As may be seen from FIG. 8a, the bottom portion 154 is provided with an opening 158, and at its upper end according to the drawing, the bottom portion has a rounded-off nose portion 159. The strap 100' is introduced from above vertically or at an angle, about this rounded nose portion 159 and is led in through the opening 158 to continue downwards between the bottom portion 154 and a counter or supporting portion 160 attached to the housing 52', and further to the pulling means 130'. A shaft 162 passes completely freely through the openings in the flanges 156 of the slide means 152 and is mounted in bearings (not shown) taking up force, in the end walls of the housing 52'. A solid eccentric 164 rigidly attached to the shaft 162 and fitting in between the flanges 156 of the slide means 152 is arranged to engage with the bottom portion 154 in such a way that on an attempt to pull the strap 100' out of the housing, i.e. upwardly according to FIG. 8a, the eccentric 164 is caused to turn anti-clockwise thereby clamping the strap 100' solidly against the counter portion 160 via the bottom portion 154. By means of a torsion spring (not shown) acting about the shaft 162 and biassed to turn such shaft No. 2 and the eccentric 164 anti-clockwise, a holding moment is obtained on the latter, whereby the slide means 152 and thereby the strap 100' are continuously kept against the counter means 160. As with the previously described embodiment 114, the locking device 150 can be released from outside by a lever 70', if the shaft 162 is rigidly joined to said lever 70' at its end projecting through the bearing in the housing 52'. When the lever 70', which is indicated by dotted lines in FIG. 8a, is swung clockwise according to the drawing, the slide means 152 is disengaged, and the strap 100' can be pulled freely in and out of the housing as before.

An example of how the strap winch according to the invention can be applied in practice is illustrated in FIG. 11. The figure schematically shows a lorry deck 74 comprising a deck portion 75 with a chassis beam 76 arranged on the underside. A strap winch 50 according to the invention is screwed onto the underside of the deck portion 75, inside the one chassis beam 76. As heretofore described, the shape of the strap winch housing is suited for mounting in such a way, with its nose portion 62 projecting out along the underside of the beam 76 so that the snub roller 64 projects somewhat outside the beam. When the winch is not in use and is thus in its inactive position, the whole strap length, perhaps 7-8 meters of a terylene strap 2.5 × 50 mm in cross-section is reeled up to the storage reel in the interior of the winch housing. As apparent from the figure, the housing is in an out-of-the-way position under the deck, where it can in no way disturb loading and unloading. As previously indicated, the free end of the strap is provided with a suitable attaching or hooking-on member 80, a suitable embodiment thereof being described below, and when not in use it can, together with the attached strap end, be placed on a suitable (not shown) retaining fixture arranged on the exterior of the winch, where the hook is easily accessable when the winch is to be used.

For tieing on a load on the deck 74 with the help of the strap winch according to the invention, the lorry driver or loader takes the attaching hook 80 from its holder and pulls out the required strap length from the winch. As previously described, he disengages the locking wedge device 114 by operating the disengaging arm 70 projecting out from one side of the winch. The strap, a generous length of which has been withdrawn, is thrown over the load and hooked onto the chassis beam 76 on the opposite side of the deck as shown in FIG. 11. Strapping which has not been used is allowed to run back into the winch housing where it is once again wound up by the spring mechanism of the winch. To facilitate reeling, the loader can now also disengage the locking device by means of the arm 70 so that the strap can pass freely through the device without rubbing against the wedge. After this taking-in operation, the strap 100 lies lightly tensioned over the load, and the loader can now winch home the strap in a manner described previously, and tension it tightly around the load, using the lever 72 which is preferably arranged for removal and by which he rocks the pulling means in the winch so that the strap is stepwise fed in through the locking device and reeled up on the storage reel in the interior of the winch.

Several strap winches according to the invention maybe placed along the lorry deck, so that several strap casts according to FIG. 11 can be arranged at a suitable distance from each other along the deck.

Figure 14:
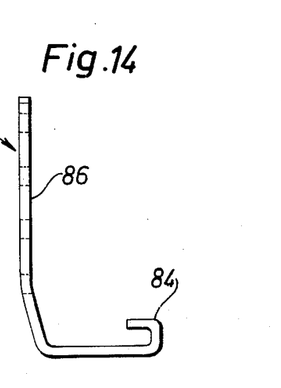

A practical detail is the "anchorage" or attachment of the free end of strap 100. For the present purpose, the end should be connected to a suitable hooking-on hook, and as is familiar, straps are conventionally attached to hooks, eyelets etc. by the strap being threaded through an opening in these elements to form a loop fixed in place by stitching. It is however a fairly expensive operation, and because of wear between the strap and the edge of the opening in the hook or eyelet a weak point arises. Furthermore, considerable restraint is created with regard to length of strap, since the sewn-on hook or eyelet forms a fixed end point, and the strap can not be shortened without sewing the hook on again. If the strap fails at or nearly at the hook, and this takes place out in the open where there is no possibility of sewing on the hook again, personnel can be compelled to resort to troublesome and dangerous makeshifts This drawback is removed by the help of the above-mentioned attaching hook 80, which can be attached to the strap end by threading it on, and without any sewing or riveting operations at all, as will be explained below while referring to FIGS. 12-14.

Figures 12, 13:
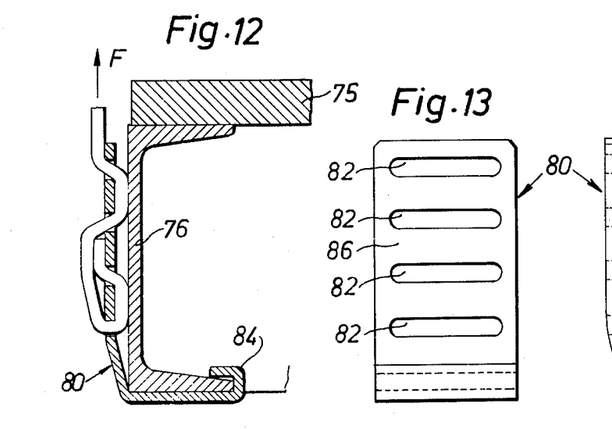
FIG. 12 shows a detail of FIG. 11 to an enlarged scale, more closely the lower left-hand portion of this figure showing a strap fastening.
FIGS. 13 and 14 are finally front and side elevations respectively of a fastening catch or hook for the free end of the strap incorporated in the strap winch according to the invention.

Seen from the side (see FIG. 14), the hook 80 has an L-shaped profile combined from a short and a long shank, of which the shorter is terminated by a folded-up hook 84 arranged for hooking over an edge, e.g. the edge of a channel section chassis beam 76 as described above. The long shank 86 is provided with a number of narrow slits or openings 82, their number being at least three, preferably four. If a strap is threaded through the slits 82 backwards and forwards between the inside and outside of the shank 86, for example as shown in FIG. 12, the strap will be anchored onto the hook 80 and, because of friction, the connection between the strap and hook will be self-locking.

The invention has been described above while referring to a strap winch for tieing on loads on a lorry deck, but it is expressly stated that the strap winch according to the invention is in no way limited to such a use. Apart from tieing-down in general, the winch can be used in all such cases where modern straps or belts of synthetic material are used to create large tensional forces, but there are difficulties in creating a firm grip on the strap for successive tensionings, e.g. when mooring a boat. Another advantage with the strap winch according to the invention is that the strap in the inactive position can easily be protected from unauthorized operation. The strap is entirely enclosed in a protective housing and the locking wedge device can easily be provided with a key-operated lock making it impossible to pull the strap out of the housing.

In conclusion it is pointed out that the essence of the invention resides in the new pulling mechanism 30, 130, with its ability of effectively gripping all kinds of modern straps or belts of synthetic material, while for the remainder a designer has large freedom in constructing both the reeling device or storage reel 12, 112 and the locking device 14, 114. With regard to the reeling device, the strap winch according to the invention can be simplified in so far as the automatically operating sprung reel is replaced by a simple hand crank, the winch being operated in such a case by the operator using one hand for "pulling home", i.e. swinging the lever 72 backwards and forwards, while with the other hand be successively turns the crank of the winding reel to collect the pulled-in strap. Finally in regard to the locking device, several known locking devices holding one way can be used, even if those proposed are especially advantageous because of their simplicity and ability to provide smooth and uniform load application and distribution of locking pressure over the strap. The invention is thus not limited to the described embodiment but can be varied in different respects within the scope of the basic inventive idea.

We claim:

1. A strap winch for pulling in and storing a strap, particularly synthetic fibre strap characterized by surface slipperiness, plastic deformability and high tensile strength, said winch comprising:

a storage device for continuously collecting a strap arriving at the winch;

a step-wise pulling mechanism through which the strap passes to said storage device and which is arranged to grip and with great force pull the strap for further passage to said storage device;

a locking means through which the strap is to be pulled by said step-wise pulling mechanism for allowing the strap to pass freely in the direction of pull, but automatically locking the strap against movement in the opposite direction;

said step-wise pulling mechanism including means pivotable for oppositely bending adjacent parts of said strap into at least an S shape and therewith pulling lengths of said strap from both said storage device and locking means, and reversely pivotable for freeing the S-shaped portion of said strap for addition of a corresponding portion of said strap to said storage device, in which said pivotable means comprises a camshaft having a cam peak thereon, said camshaft having a longitudinal axis fixed with respect to at least one of said storage device and locking means, said camshaft being rotatable on its longitudinal axis, a counter piece, a support means pivotally mounted on said camshaft and orbitally carrying said counter piece, the strap being arranged to pass between said camshaft and counter piece, the minimum spacing between said counter piece and cam peak being less than the thickness of the strap, and an operating means fixed to said camshaft and rotatable for forcibly wrapping said strap in said S-shape about said counter piece and along the side of said camshaft, through continued orbital movement of said counter piece.

2. A strap winch as claimed in claim 1, in which said support means comprises a shaft ad two cheek plates united by said shaft, said cheek plates being pivotally mounted on opposite sides of said cam peak on said cam shaft, said counter piece comprising a roller freely rotatably mounted on said shaft.

3. A strap winch for pulling in and storing a strap, comprising:

a storage device for continuously collecting a strap arriving at the winch;

a step-wise pulling mechanism through which the strap passes to said storage device and which is arranged to grip and with great force step-wise pull the strap for further passage to said storage device;

a locking means through which the strap is to be pulled by said step-wise pulling mechanism for allowing the strap to pass freely in the direction of pull, but automatically locking the strap against movement in the opposite direction, and a disengaging means connected with said locking means and operable to release said locking means from the strap and allow such strap free passage in both directions, said step-wise pulling mechanism including means defining a common pivot axis fixed with respect to at least one of said storage device and locking means, two spaced elements pivotable about said common axis, together as well as relative to each other, said pulling mechanism being located so that the strap passes from said locking means through the space between said two elements, and means actuable for pivoting the first said element about said common axis (1) relative to said second element into strap gripping relation therewith and (2) then with said second element so as to coil said strap into a convoluted shape and therewith pull a greater length of said strap into the zone between said storage device and locking means, whereby a return pivoting of said first and second elements about said common axis frees the convoluted portion of said strap for addition of a corresponding portion of said strap to said storage device, said locking means comprising a wedge lock incorporating two rigid locking planes, which define between themselves a wedge-shaped space through which said strap is to pass, a movable locking element mounted for pressing into said wedge-shaped space between one said locking plane and the strap and thereby for locking the strap against movement in one direction, friction reducing means between said movable locking element and said one locking plane for facilitating movement of said movable locking element, said friction reducing means comprising at least one rollable bearing element mounted in the vicinity of the pressure center of said locking element, i.e. where the force resultant or the element engagement pressure against the strap passes.

4. A strap winch for pulling in and storing a strap, comprising:

a storage device for continuously collecting a strap arriving at the winch;

a step-wise pulling mechanism through which the strap passes to said storage device and which is arranged to grip and with great force step-wise pull the strap for further passage to said storage device;

a locking means through which the strap is to be pulled by said step-wise pulling mechanism for allowing the strap to pass freely in the direction of pull, but automatically locking the strap against movement in the opposite direction, and a disengaging means connected with said locking means and operable to release said locking means from the strap and allow such strap free passage in both directions, said step-wise pulling mechanism including means defining a common pivot axis fixed with respect to at least one of said storage device and locking means, two spaced elements pivotable about said common axis, together as well as relative to each other, said pulling mechanism being located so that the strap passes from said locking means through the space between said two elements, and means actuable for pivoting the first said element about said common axis (1) relative to said second element into strap gripping relation therewith and (2) then with said second element so as to coil said strap into a convoluted shape and therewith pull a greater length of said strap into the zone between said storage device and locking means, whereby a return pivoting of said first and second elements about said common axis frees the convoluted portion of said strap for addition of a corresponding portion of said strap to said storage device, said locking means comprising a fixed locking plane and movable slide means coacting with it, the strap being routed between said locking plane and an engagement portion of said movable slide means, said engagement portion having an opening close to one end thereof, said locking means having a path for said strap passing around said slide means portion between said opening and said one end of said engaging portion and then through said opening and then further on between said engagement portion and said fixed locking plane, an eccentric means mounted to engage said engagement portion of said slide means and press same towards the strap and therewith for automatically preventing the strap from moving in one direction by achieving seizure of the strap between said engagement portion and said fixed locking plane.

5. A strap winch as claimed in claim 1 in which said storage device comprises a reeling roller for said strap, said roller being operable by hand.

6. A strap winch as claimed in claim 1, which said storage device comprises a reeling-up roller for the strap and a spiral spring connected thereto for winding said strap on said roller.

7. A strap which as claimed in claim 1, including a surrounding housing and a carrying deck for supporting an object, said housing being mounted under said carrying deck adjacent one side thereof, and accommodating said storage device for the strap, a connecting means attachable to said strap and forming an anchor therefor on the opposite side of said carrying deck, said housing including a portion having a passage opening for the strap, said step-wise pulling mechanism and said locking means of the winch being substantially accommodated in said housing portion and including operating lever means on the exterior of the housing for operating said winch.

8. A strap winch for pulling in and stowing a strap, comprising:
   storage means for exerting a relatively light tension on the strap and retrieving same;
   a locking means spaced along the strap from said storage means, in a direction toward the load engageable end of the strip for locking the strap against unwanted movement towards the load-engaging end thereof while permitting strap movement therethrough in the opposite direction away from said load-engaging end thereof and toward said storage means;
   a cam shaft rotatable about its own longitudinal axis, said camshaft axis being fixedly located between and with respect to said storage means and locking means, said cam shaft having an eccentrically protruding lobe located with respect to said axis, a support member carried by said camshaft axis for rotation thereabout, a counter member orbitally carried by said support member for rotation through an arcuate path around said cam shaft for disposition of said strap therebetween, the minimum radial distance between said counter member and cam lobe being somewhat less than the thickness of said strap and the radial distance between said counter member and the unlobed portion of said cam shaft being greater than the thickness of said strap;
   means actuable to rotate said cam shaft about said camshaft axis, with said strap engaged between said lobe and said counter member, for drawing additional strap material from both said storage means and locking means into a loop surrounding said counter member and lying along one side of said camshaft.

9. A strap winch as claimed in claim 1 including a disengaging means connected with said locking means and operable to release said locking means from the strap and allow such strap free passage in both directions.

10. A strip winch as claimed in claim 8 in which said cam lobe and counter member have only smoothly curved surfaces engageable with the strap, which surfaces are free of teeth.

* * * * *